(12) United States Patent
Wright

(10) Patent No.: US 8,208,670 B2
(45) Date of Patent: Jun. 26, 2012

(54) SOUND RECORDABLE/PLAYABLE DEVICE AND METHOD OF USE

(75) Inventor: Sheila A. Wright, Bloomfield Hills, MI (US)

(73) Assignee: Ann Williams Group, LLC, Bloomfield Hills, MI (US)

(*) Notice: Subject to any disclaimer, the term of this patent is extended or adjusted under 35 U.S.C. 154(b) by 953 days.

(21) Appl. No.: 12/211,567

(22) Filed: Sep. 16, 2008

(65) Prior Publication Data

US 2009/0074224 A1    Mar. 19, 2009

Related U.S. Application Data

(60) Provisional application No. 60/972,993, filed on Sep. 17, 2007.

(51) Int. Cl.
   *H04R 1/02*    (2006.01)
(52) U.S. Cl. .................... 381/334; 381/336; 381/385
(58) Field of Classification Search .......... 381/332, 381/334, 336, 385
   See application file for complete search history.

(56) References Cited

U.S. PATENT DOCUMENTS

| | | | |
|---|---|---|---|
| D251,829 S | 5/1979 | Sulek | |
| 4,508,457 A * | 4/1985 | Aizawa | 368/63 |
| 4,633,863 A | 1/1987 | Filips et al. | |
| 4,717,261 A * | 1/1988 | Kita et al. | 368/63 |
| 4,791,741 A | 12/1988 | Kondo | |
| 4,955,164 A | 9/1990 | Hashish et al. | |
| D317,162 S | 5/1991 | Wingate | |
| D320,793 S | 10/1991 | Wingate | |
| 5,387,108 A | 2/1995 | Crowell | |
| 5,444,673 A | 8/1995 | Mathurin | |
| 5,511,046 A * | 4/1996 | Vanderpal | 368/63 |
| 5,999,494 A | 12/1999 | Holzrichter | |
| D429,168 S | 8/2000 | Jannard et al. | |
| D439,528 S | 3/2001 | Eliav | |
| 6,220,916 B1 * | 4/2001 | Bart et al. | 446/26 |
| 6,285,867 B1 | 9/2001 | Boling et al. | |
| D451,036 S | 11/2001 | Zuckerman et al. | |
| 6,857,775 B1 * | 2/2005 | Wilson | 368/281 |
| 6,859,609 B1 * | 2/2005 | Watkins | 386/242 |
| D511,337 S | 11/2005 | Kim | |
| D512,406 S | 12/2005 | Shimizu | |
| D514,122 S | 1/2006 | Rodarte | |

(Continued)

FOREIGN PATENT DOCUMENTS

KR    20-0402285 Y1    11/2005

(Continued)

OTHER PUBLICATIONS

International Search Report, Application No. PCT/US2008/076527, mailed Feb. 13, 2009.

*Primary Examiner* — Mary Wilczewski
(74) *Attorney, Agent, or Firm* — Dobrusin & Thennisch PC

(57) ABSTRACT

A portable and wearable sound recordable and playable device comprising an electronic module that provides audio recording and playback functions and that includes at least one integrated circuit having associated memory storage, a microphone and a speaker, and a power source; a bulbous portion that substantially encapsulates the electronic module and that is configured so that the device has a substantially continuously contoured outer surface that is free of any display; and one or more exposed user controls that signally communicate with the electronic module and penetrate through the bulbous portion.

20 Claims, 3 Drawing Sheets

U.S. PATENT DOCUMENTS

| | | |
|---|---|---|
| D525,880 S * | 8/2006 | Okamura .......................... D10/2 |
| D527,704 S | 9/2006 | Rodarte |
| D531,159 S | 10/2006 | Park |
| D541,179 S | 4/2007 | Ahistrom |
| D551,991 S | 10/2007 | Ohki |
| D560,211 S | 1/2008 | Kim et al. |
| 7,395,090 B2 | 7/2008 | Alden |
| 7,398,635 B2 | 7/2008 | Fairweather et al. |
| D582,394 S | 12/2008 | Hong et al. |
| 7,745,717 B2 * | 6/2010 | Sasaki et al. .................... 84/615 |
| 2001/0011025 A1 * | 8/2001 | Ohki et al. .................... 455/556 |
| 2004/0248619 A1 | 12/2004 | Graiger et al. |
| 2005/0013197 A1 * | 1/2005 | Chung et al. .................... 368/10 |
| 2008/0137898 A1 * | 6/2008 | Nenner .......................... 381/385 |
| 2009/0074224 A1 * | 3/2009 | Wright .......................... 381/385 |
| 2009/0164219 A1 * | 6/2009 | Yeung et al. .................... 704/258 |
| 2011/0003665 A1 * | 1/2011 | Burton et al. .................... 482/9 |
| 2011/0200220 A1 * | 8/2011 | Wright .......................... 381/332 |
| 2011/0202369 A1 * | 8/2011 | Sanchez .......................... 705/3 |

FOREIGN PATENT DOCUMENTS

| | | |
|---|---|---|
| KR | 10-2001-0082589 A | 8/2006 |
| KR | 10-2007-0074216 A | 7/2007 |
| WO | 2006/091738 A1 | 8/2006 |

* cited by examiner

SOUND RECORDABLE/PLAYABLE DEVICE AND METHOD OF USE

CLAIM OF BENEFIT OF FILING DATE

The present application claims the benefit of the filing date of U.S. Provisional Application No. 60/972,993, filed Sep. 17, 2007, the contents of which are hereby expressly incorporated by reference.

TECHNICAL FIELD

The present invention pertains generally to portable and wearable digital audio recordable and playable devices, and more particularly to digital audio recordable and playable wristbands or pendants.

BACKGROUND OF INVENTION

Existing wearable devices with record and playback features are generally limited to watches that include an additional recordable/playable feature. The existing audio recordable/playable watches suffer a disadvantage in that they are bulky and have poor sound quality due to focusing the design and packaging primarily on timekeeping, music playing, or other functions apart from recording and playback. Further, due to the need for a display window, packaging requirements tend to limit the range of geometric configuration options, and will tend to result in devices that are not aesthetically pleasing, or that prohibit or otherwise limit customization.

Some wearable devices exist that require the device to be connected to a computer to playback the recording. This has the potential to limit the useful application of the devices as they tend to be more expensive, and often require a part for attachment to the computer.

Various portable devices exist with recording capability, playback capability, or both. However, these tend to be packaged along with other electronic components (e.g., a music player such as an MP3 player), which cause the devices to be more expensive and/or require special manufacturing or packaging considerations. Also because there are multiple electronic components packaged together the space is limited and the components must be reduced in size (increasing cost or reducing quality or both). With some of the existing applications the speaker and microphone have been reduced in size to the point that the user must yell into the microphone to even record a message; the user must press the speaker against their ear to hear the message, or both. Further, various such devices are part of some other article (e.g., a key ring, a writing instrument, or otherwise), which may limit the convenience with which the devices can be used, or which could easily become lost, such as when used by children.

Another problem with existing devices is that many of the devices are not compact. If larger parts are used it only increases the size of the housing. Once a larger housing is employed the recordable/playable device cannot be comfortably worn by women or children because the rigid componentry generally will not flex to conform comfortably to a smaller wrist.

Examples of efforts by others to address portable recordable devices are illustrated in U.S. Pat. Nos. 4,791,741, 5,387,108, 5,444,673, 5,999,494, D320,793, and D317,162 incorporated by reference. Heretofore, the art has complicated the approach to recordable wearable wrist devices by trying to package many features in an attractive and useful device. The result has been a widespread general lack of consumer acceptance of such devices.

Accordingly, it would be attractive to have a portable and wearable digital audio recordable and playable device that overcomes one or more of the above disadvantages.

SUMMARY OF THE INVENTION

The present invention meets this need by providing a solution in the form of a portable and wearable sound recordable and playable device (e.g. a digital device) that includes a band (e.g., one that may be continuous or fastened at its ends) that substantially encapsulates an electronic module that provides audio recording and playback functions so that the device has a outer surface (e.g. a contoured outer surface that includes curvature in both the longitudal and/or transverse directions) that may be free of any display. The electronic module may include an integrated circuit having associated memory storage (and which may be programmable), a microphone, a speaker, a power source, an optional amplifier, and one or more user controls that signally communicate with the digital electronic module and which may penetrate through the band or be actuatable by contact with the band. Desirably the quality of the recording is clear and audible to a normal human ear, the manufacture of the device is relatively straightforward and low cost. By virtue of the unique packaging configuration herein, relatively large and/or efficient speakers and/or microphones (and/or other electronic components e.g. an amplifier) can be used so that the recording quality may be enhanced and the volume will be at a decibel level that can be heard more easily.

It will be seen that the construction herein contemplates that various of the components may have an upper surface that is positioned at a different height than the upper surface of adjoining components. For example, a microphone may have an upper surface that resides below (e.g. also spaced apart from) an upper surface of the speaker; a microphone may have an upper surface that resides below (e.g. also spaced apart from) an outer surface of any cone of the speaker, or both. Components of the devices herein may be housed in a bulbous portion, e.g. one having a diameter or largest spanning dimension less than about 60 mm, more preferably less than about 45 mm (e.g. about 25 to about 40 mm). In this manner, the bulbous design allows for large high quality componentry to be used, affords a platform easily adaptable to accommodate various user sizes with a single bulbous portion or both. The bulbous design also lends itself well to customization.

More specifically, in one aspect of the invention, there is contemplated a portable and wearable digital sound recordable and playable device comprising: a digital electronic module that provides audio recording and playback functions and that includes at least one integrated circuit having associated memory storage, a microphone, a speaker, a power source, an optional amplifier, and a bulbous portion (e.g. a band) that substantially encapsulates the digital electronic module and that is configured so that the device has a contoured outer surface (e.g. a substantially continuously contoured outer surface) that may be free of any display; and one or more user controls that signally communicate with the electronic module and which may penetrate through the bulbous portion.

This aspect may be characterized by one or any combination of the following features: the device is a wristband; the bulbous portion is part of a band configured as a continuous loop; the bulbous portion has a rounded outer surface and the electronic module is located in the bulbous portion; the rounded outer surface is defined by a plurality of different radii of curvature; the device is free of any user time-keeping function (e.g., it includes no watch or watch display that can be used by the user); the electronic module is provided with a pre-recorded message; the device (e.g. the band) is free of any hinges; the device (e.g. the band) is free of any hinge pins; the device (e.g. the band) includes a plurality of apertures for exposing any microphone or speaker; the device (e.g. the band) is made from a thermoplastic polymer that has a coating layer over its outer surface; the device (e.g. the band) includes at least two exposed user controls that laterally project from at least one side of the bulbous portion; or vertically from the face of the device (e.g. the band); or the user controls penetrate through the device (e.g. the band) and signally communicate with the electronic module.

In another particular aspect, the invention contemplates more specifically a portable and wearable sound recordable and playable wrist device comprising: an electronic module that provides audio recording and playback functions and that includes at least one integrated circuit having associated memory storage, a microphone and a speaker, an optional amplifier, and a power source; a wristband that substantially encapsulates the electronic module and that is configured so that the device has a substantially continuously contoured outer surface that is free of any display and includes a bulbous portion that has a rounded outer surface defined by a continuously curved outer surface having a plurality of different radii of curvature and that houses the digital electronic module, the wristband being free of any hinge pins; and at least two exposed user controls that signally communicate with the electronic module and that penetrate through the wristband and laterally project from at least one side of the bulbous portion; and wherein the device is free of any user time-keeping function. The bulbous portion of the wristband houses the electronic module.

This aspect may be further characterized by one or any combination of the following features: the band is a thermoplastic polymer that has a coating layer over its outer surface; the band is free of any hinges; the band is configured as a continuous loop; or the electronic module is provided with a pre-recorded message; or the band includes a plurality of apertures for exposing any microphone or speaker.

One possible use of the wristband may be to provide reminders to the wearers; thus, the invention contemplates at least one step of providing reminders to the wearer. Some examples of possible uses could be: providing message reminders to children, alerting persons to a medical condition of the wearer, providing emergency contact information, providing an advertising message (providing a way to communicate with a user about a promotional program for a good or service), modifying behavior for achieving user weight loss, for smoking cessation or both, assisting user to memorize information, or reminding a user about taking and/or refilling medication (e.g. prescription drugs).

Another possible aspect of the invention is a use as a necklace, chain, or pendant instead of as a wristband. Accordingly, pursuant to another aspect of the present invention, there is contemplated a portable and wearable sound recordable and playable device that includes an electronic module that provides audio recording and playback functions and includes at least one integrated circuit having associated memory storage, a microphone, a speaker, an optional amplifier, and a power source; a pendant that substantially encapsulates the electronic module and that is configured so that the device has a bulbous portion that is free of any display and that has a rounded outer surface defined by a continuously curved outer surface having a plurality of different radii of curvature and that houses the electronic module; at least two exposed user controls that signally communicate with the electronic module and that penetrate and laterally project from at least one side of the bulbous portion; where the bulbous portion contains at least one opening; where the opening may have a strap or chain placed though to hang the device from the user's neck; and wherein the device is free of any user time-keeping function.

DESCRIPTION OF DRAWINGS

Brief Description of the Drawing

Figure 1:
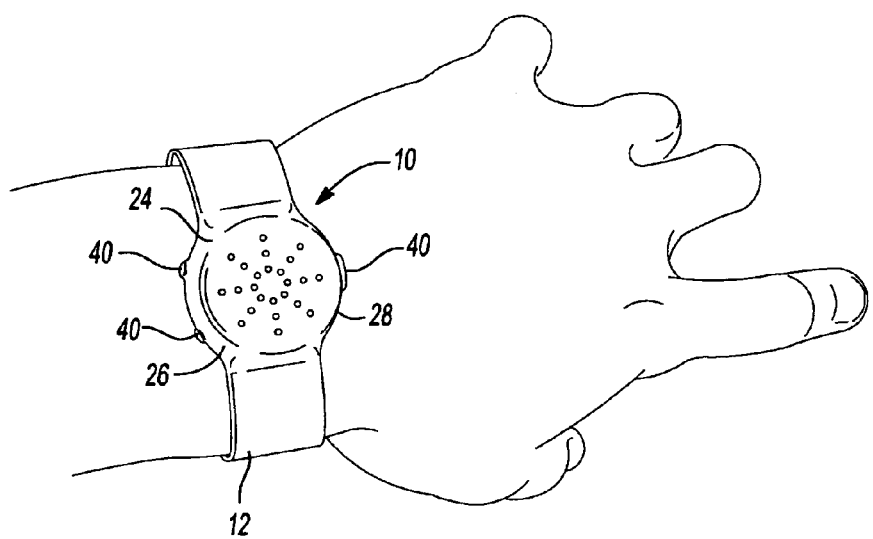

FIG. 1 is a perspective view of an illustrative device of the invention.

Figure 2:
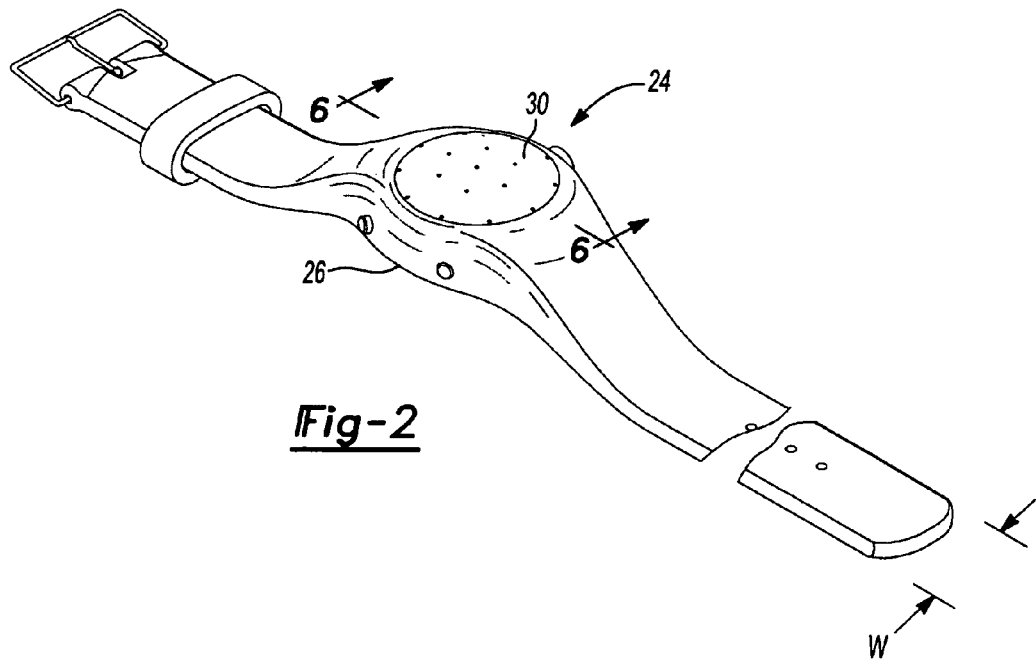

FIG. 2 is a perspective view of another illustrative device.

Figure 3:
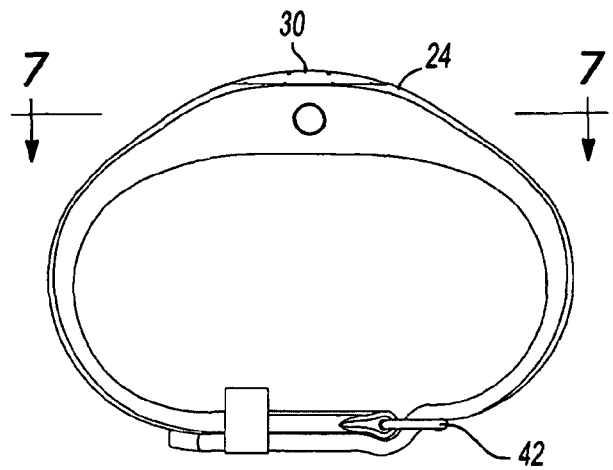

FIG. 3 is a side view illustrating an example of a non-continuous band.

Figure 4:
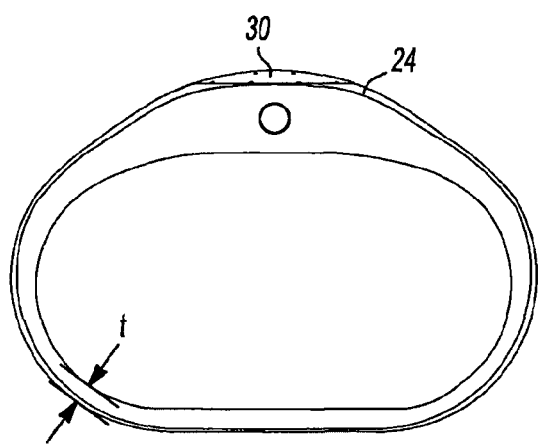

FIG. 4 is a side view illustrating an example of a continuous band.

Figure 5:
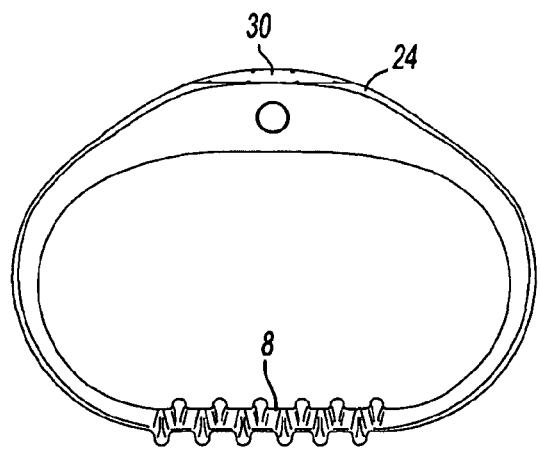

FIG. 5 is a side view illustrating a continuous wristband showing an expandable feature.

Figure 6:
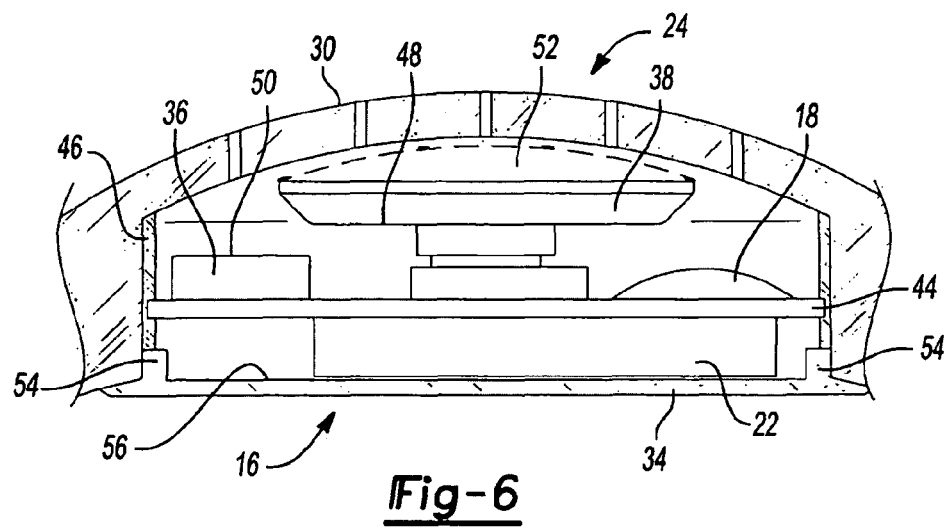

FIG. 6 is a cross-sectional view of an illustrative bulbous portion of an illustrative device (e.g. a wrist device, a neck device, or otherwise) displaying components of an electronic module.

Figure 7:
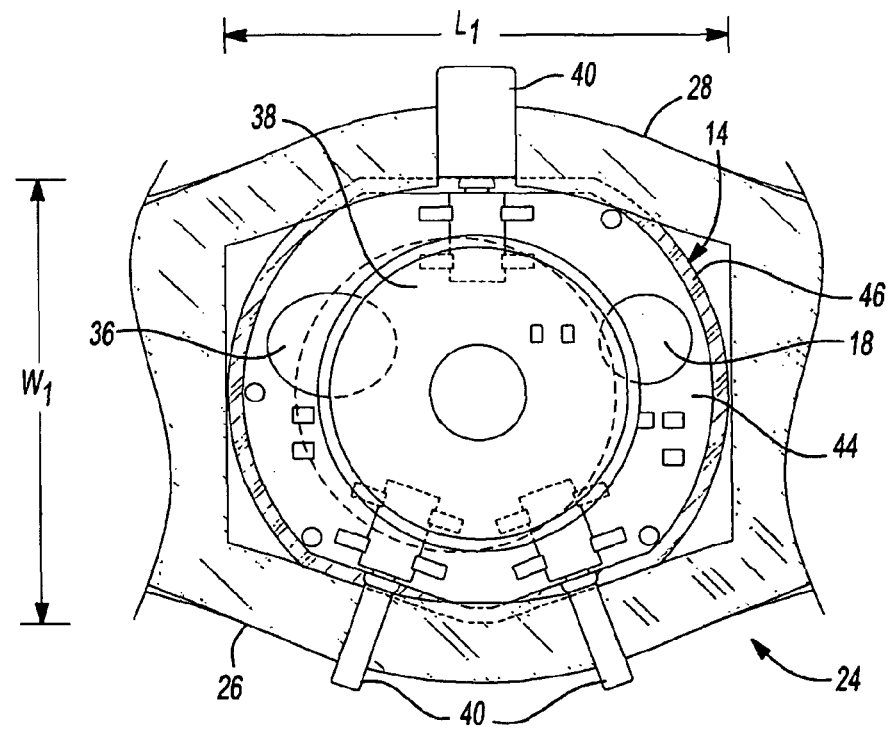

FIG. 7 is a sectional view of a back side of an exemplary bulbous portion.

DETAILED DESCRIPTION

Turning now to the detailed illustrations of examples of the invention, and with reference to the drawings, it is seen that the invention pertains generally to a digital sound recordable and playable device 10, such as a wristband, that includes a band 12 (such as one that fits securely around a wrist of a user, so that in ordinary use it remains generally on the arm of the user, even though the fit may be a relatively loose fit that allows it to slide up and down a user's arm) and module 14 (e.g., a digital electronic module), preferably one that provides voice and/or sound recording and playback functions carried on the band. The module 14 may be placed in a housing 46, which may be an open ended ring or other structure having peripheral walls that at least partially surround the components (see e.g. FIG. 6). The housing may aid in placing the module in the band, while preventing the components from shifting or damage during the encapsulation process. The band may be manufactured with the housing already incorporated into the bulbous portion and/or the housing may be assembled outside of the band and then the components may be assembled into the housing.

The module 14 is preferably encapsulated within the material of the band. It may be totally encapsulated (e.g., it is encapsulated with a resilient plastic during a molding operation) or only partially encapsulated. For example, as seen in FIG. 6, partial encapsulation is shown, by which an opening 16 is provided in the rear of the band, into which the digital electronic module is installed. The opening may be concealed by a cover after installation.

The band is a resilient plastic that is molded around the electronic module. One possible approach is that the resilience of the band allows it to stretch for expanding to place over a hand or fist onto a wrist. For example, the band may have one or more elastomeric components, one or more structures that allow for temporary expansion and subsequent return to an initial unstretched state or both. For example, the structure may be a corrugated or accordion structure 8 that includes a plurality of adjoining folds that flex relative to each other, effectively temporarily elongating the band during the flexure. One particular configuration for the device herein is illustrated in FIG. 5. That embodiment is shown having a band having a corrugated or accordion structure that includes a plurality of adjoining folds connected to each other so that they flex relative to each other when tension is applied, thereby allowing the band to stretch and to return toward its unstretched state.

One particular configuration for the devices herein is illustrated in FIGS. 4 and 5, and includes a band that wraps securely around a wrist. The band may be a one piece configuration. Thus (as with the embodiments of FIGS. 1-3, without limitation) it may be free of hinges or hinge pins, such as are normally associated with watch devices. It should be appreciated, however, that devices employing such hinges or hinge pins may still fall within the present scope of the invention.

At least one module 14, preferably a digital electronic module, provides voice and/or sound recording and playback functions. Preferably the module 14 is configured so that it records a plurality of messages without deleting and/or overwriting existing recordings, it re-records messages a plurality of times (e.g., at least 500 times, and more preferably at least 1000 times, and still more preferably at least 5000 times without degrading the quality of the message (as detectable by an ordinary human ear)), it records messages of at least thirty seconds, and more preferably at least one minute; or any combination thereof. The electronic module may be free of any hazardous substances, e.g., it may include or consist of materials that adhere to conventional standards that impose the restriction of hazardous substances (ROHS).

It is expected that the module will include one or more integrated circuits 18, an input/output device 20 (e.g., one that includes a microphone to capture information and/or a speaker for replaying captured information, and user controls to prompt playback or recording of a message) that is optionally encapsulated in the band, and located in the digital electronic module, and at least one (more preferably a plurality of) user controls 40. The user controls (e.g. push buttons or other actuators that may be outwardly biased) may be operated, for example, to actuate and control operations of functions programmed in the integrated circuit or elsewhere in the module) such as play, record, stop, fast-forward, and rewind. A suitable power source 22 (e.g., a battery, a solar cell, or the like), may also be located in the device (e.g. beneath a printed circuit board) for powering the module.

Turning in more detail to the construction of a band, within the present teachings it may have a bulbous portion 24. For example, with reference to FIG. 1, the bulbous portion 24 may have a first curved edge 26 opposite a second curved edge 28. The curvature of the edge may be of a generally constant radius of curvature. More preferably it has a radius of curvature that varies along its length. The first curved edge 26 and the second curved edge 28 may be substantially symmetrical, or asymmetrical about a longitudinal axis of the band. The band also may be configured so as to not have a bulbous portion. Thus, the portion of the band containing the module 14 may be elongated and have essentially (e.g. it may be such that its width (w) is substantially constant over the entirety of the device) the same width as the band so that all of the components; the bulbous portion of the band containing the module 14 may have the shape of, for example, a square or rectangle.

Additional aspects of the invention can be gleaned from the teachings herein, including those of FIGS. 1 and 2 of U.S. Provisional Application Ser. No. 60/972,993, filed Sep. 17, 2007, incorporated by reference herein, which show various alternative embodiments.

The band will preferably include an outward facing surface 30. The outward facing surface 30 may generally include one or all of its portions having a continuous curvature; it may, however, include one or none generally flat outer surfaces, such as is show in FIGS. 1 and 2 of U.S. Provisional Application Ser. No. 60/972,993, filed Sep. 17, 2007, incorporated by reference herein, which show various alternative embodiments.

The curvature may be defined by an arcuate, convex surface that includes a plurality of different radii of curvature. The band may be of generally constant width, or it may include plural different widths (e.g., a maximum width $w_{max}$, and a minimum width $w_{min}$). The ratio of $w_{max}:w_{min}$ preferably is greater than about 1:1, more preferably greater than about 1.2:1. The ratio of $w_{max}:w_{min}$ preferably is less than about 3:1, more preferably less than about 2:1. For example, the ratio of $w_{max}:w_{min}$ may be about 1.3:1 to about 1.8:1.

The band may have one or more wall thicknesses (t). The band may be of generally constant thickness, or it may include plural different thicknesses (e.g., a maximum thickness $t_{max}$, and a minimum thickness $t_{min}$). The ratio of $t_{max}:t_{min}$ preferably is greater than about 1:1, more preferably greater than about 2:1. The ratio of $t_{max}:t_{min}$ preferably is less than about 12:1, more preferably less than about 10:1. The wall thickness of the band at any cross-section may vary by less than about 70% the average wall thickness; more preferably it may vary by less than about 50% the average wall thickness, and still more preferably it may vary by less than about 20% the average wall thickness. For example, if a band has an average wall thickness of about 2 mm, the maximum thickness anywhere on the band may be about 3.4 mm, and the band will have a minimum thickness at its thinnest section of at least about 0.6 mm.

The band may be formed to include an opening 16 (e.g., a generally concealable opening such as an opening in a rear surface 34) suitably sized and configured to receive the module 14. The module 14 may be snap fit into the opening, press fit into the opening or otherwise placed in the opening. For example, the module may have a span that is larger than the opening, so that the module is inserted through the opening by elastically stretching the band to receive the module, after which the band opening returns to its original size. The module 14 may also be placed into the opening 16 and then glued, bonded (e.g. sonic welding), or both in place. A separate plug or cover may be employed to cover the opening (e.g., a friction fit plug, a threaded screw on cap, or otherwise). It is also possible that the opening may be one that temporarily enlarges to allow insertion of the module and then effectively shrinks to return to an initial size opening.

Possible materials to make the wristband include but are not limited to plastics, rubbers, textiles, natural fibers, metals, etc. Any combination of these materials may also be used. The polymeric material that forms the band may be selected to have a soft-touch feel. It may be flexible so as to substantially conform to a user's wrist. It may be selected to have a relatively low coefficient of friction. Examples of polymeric materials may include a synthetic thermoplastic, a synthetic thermoset, a natural rubber, or a combination thereof. One particular preferred polymeric material is a polyurethane, preferably the wristband will be made of a flexible polyurethane. Another material may be a polymer that includes silicon (e.g. a silicone polymer). The polymeric material (e.g. polyurethane) may be a one part or two part system. It may have liquid reactants that chemically react to cure and harden. It may be formed of a molten material that solidifies and hardens. The assembled band and components may meet all safety standards for toys (e.g. ASTM F963, CHPA, EN 71, and AS/NZS ISO 8124).

The polymeric material may include a suitable colorant, for example, titanium dioxide, carbon black, iron oxide, or other colorants. The polymeric material may include as one of its components up to about 10% by weight of carbon black, titanium dioxide, iron oxide, or a combination thereof.

One preferred band is a polymeric band (e.g., including a polyurethane polymer) that has a scratch resistant coating layer over its outer surface. This coating may be high gloss, matte, or some combination thereof. Preferably the "face" of the wristband will be a high gloss scratch resistant urethane coating over the ink and the back of the band will be a matte finish. The coating layer may receive a printed design (e.g., a screen printed design, an ink-jet printed design or otherwise), a thermal transfer design, a decal, or both thereafter. One approach contemplates custom ink-jet printing of a design onto the band. The coating layer preferably is less than about 100 microns, and more preferably less than about 50 microns, (e.g., about 10 microns or less). The coating layer may be substantially optically transparent, although an opaque layer is also possible. One preferred approach is, subsequent to molding, to employ a step of applying a resinous coating, such as one that includes or consists essentially of a free radical polymerization reaction product (e.g., an acrylate or methacrylate), one that is a reaction product of a polyol and isocyanate (e.g., a polyurethane or a polyurea) to the band. It may also be possible to co-mold a second polymeric material onto the band, such as by overmolding.

One or more suitable seals may be employed as desired for achieving a desired level of water resistance. For example, it is contemplated that the devices herein may be water resistant to at least 30 m per ISO 2281, or possibly even to at least 100 m per ISO 6425.

Seals may be suitably located between the module and the band for providing a barrier over the module and preventing direct exposure of the module to moisture. A suitable barrier or seal may be employed over any of the components of the module (e.g., over a speaker and/or microphone).

It is possible that the devices herein will include a forward facing display window, e.g., to display a LED, LCD, or other readout. However, preferably, the devices are free of any display window. The devices herein may be configured to include a port, transmitter or other such for allowing communication (e.g., signaling communication) with a computer as well as other optional features or accessories. For example it may include a transmitter for wireless signaling communication with a computer.

One embodiment of the wristband contemplates one continuous piece having a continuous curving geometry and no clasp for attachment. Another embodiment for the devices herein is illustrated in FIG. 3, and includes a non-continuous band that may use a clasp 42 or other suitable mechanical fastener to join the two ends to keep the wristband securely around a user's body. A preferred embodiment of the wristband includes a surface that has a continuous curving geometry, optionally with one or more clasps for attachment. The band may be free of hinges in the center of the band, to aid forming the wristband to the wrist. The band may be free of any pivoting hinges (e.g. free of any hinges with pins). The wristband may be made of a flexible material and, therefore, forms to the wrist without the aid of hinges. The non-continuous wristband using a clasp may attach the wristband to the wrist using a plurality of different clasps, for example but not limited to, Velcro™, button, buckle, loop, magnets, hook etc., or any combination. For example, in lieu of mechanical clasps, it is possible that opposing polarity magnets may be employed, a single magnet and opposing metal member (e.g. iron, nickel, cobalt) so that they provide an attractive force for securing the band in a closed position. The magnets may be exposed on their surface or encapsulated within the band.

If a clasp is used the preferred clasp is a buckle made of stainless steel with a matte finish. The continuous wristband may form a circular geometry and may be stretchable or elastic, so that a hand may slide through the center of the wristband, and the wristband can be placed securely on the wrist of the user.

The devices may have user control features. These control features may be visible and extend laterally from the sides of the wristband or vertically from the bulbous portion 24 of the wristband. The surface may be contoured or flat. The control features may be made of different materials such as stainless steel, titanium, aluminum, etc. and more preferably made of a polymeric material (e.g. polyurethane) or a material similar to that of the band. The wristband could have a plurality of user controls 40, which perform different functions, for example but not limited to, play, record, stop, fast-forward, rewind, delete, and volume control. These controls 40 may also be internal or covered to avoid accidental pressing of the buttons, which could result in, for example but not limited to, accidental deletion or playing of messages. Optionally the method of recording a message may require a step of inserting an object (such as the tip of a pen) into a designated location (e.g., a protected location) to activate the record feature. This could help prevent a user from inadvertently recording over a previously recorded message.

Another feature of the devices herein is the speaker and microphone cover located at the outward facing surface 30 or "face" of the wristband. The "face" of the wristband is located over the electronic module in the wristband. The "face" may have different visible and functional aspects, for example but not limited to, holes, slots, or a speaker grill, as seen in FIGS. 1 and 2. One unique feature of the invention resides in the simplicity of the face geometry. It may be a single smooth continuous surface (but for any grill openings). As mentioned, a barrier (e.g., a moisture resistant membrane) may be disposed over the module, but beneath the grill. This allows for the electronic module to stay protected while allowing sound to travel to a microphone 36 and from a speaker 38, thereby creating clearer recordings and messages. One approach contemplates that fewer than 100 holes are provided on the outward facing surface 30.

The recordable/playable wristband features an electronic module. Although a digital module is preferred, analog components or a combination thereof can be used in the wristband. The electronic module may contain, but is not limited to, a microphone 36, speaker 38, power source 22, an amplifier, and buttons or other suitable actuators for controlling operation of the module. Again, all of these components may be made of a ROHS material. The electronic module may be entirely located in the wristband or partially located in the wristband. The electronic module may be molded into the wristband or may be assembled and then put in the wristband through an opening after the wristband is molded. The optional opening may be located on the back of the wristband opposite the "face" of the wristband. An electronic module located in the wristband may be water resistant. The level of water resistance as defined in ISO 2281 and ISO 6425, and are hereby incorporated by reference. The electronic module allows for the recording, storing, and playback of messages. The electronic module may be capable of recording a plurality of messages without having to delete or write over existing messages, while still being able to access existing messages.

Messages may be recorded and re-recorded over without the quality of the message degrading. The electronic module is also capable of recording one or more lengthy messages (e.g., greater than about 5 second more preferably greater than about 10 seconds (e.g. about 15 seconds or longer)).

One or more integrated circuits 18 may be employed, such as by way of one or more chips located in the electronic module 14, and may be programmable for performing the functions of the devices herein, may provide the storage or memory for the module, or both.

FIGS. 6 and 7 illustrate one possible configuration for an electronic module of the invention. There is shown a speaker 38, a microphone 36, a power source 22 (e.g. a battery), one or more suitable integrated circuits 18 (one or more of which may include amplification circuitry for amplifying sound), and a printed circuit board 44. The speaker and the microphone preferably are positioned relative to each other as follows: the microphone 36 is positioned off to the side of the speaker. A portion of the microphone and battery may be located under the speaker or partially located under the speaker so that all of the components fit into the wristband.

Each of the microphone and the speaker preferably has a central axis that is generally aligned perpendicular to the printed circuit board. The separation between each axis preferably is less than about 20 mm, more preferably less than about 15 mm (e.g. it is about 8 to about 12 mm). Either or both of the microphone or speaker may optionally include a protective membrane (such as is shown by the curved phantom line of FIG. 6 for the speaker). The speaker may have a bottom edge 48. The microphone may have an upper edge 50. The respective upper edges optionally may not be coplanar to each other, but will be spaced axially apart from each other (for example the respective edges may be spaced by a distance of less than about 3 mm, more preferably less than about 1 mm). As shown in FIG. 6 the speaker may partially overlap the microphone.

The speaker may be round or elliptical. It may have a top edge 52 that is disposed about at least 2 mm above the printed circuit board (e.g. about 3.5 mm), a diameter (or major axis, if elliptical) of at least about 10 mm, more preferably about 15 to 30 mm (e.g. about 23 mm), or both. The microphone may be round or elliptical. The integrated circuit 18, and the microphone 36 may be located next to each other, spaced apart from each other laterally, transversely or both. The integrated circuit, microphone, and speaker may be placed toward the center of the printed circuit board (e.g. spaced inwardly of the peripheral edge of the printed circuit board). The height of the integrated circuit may be less than about 3 mm, more preferably less than about 2 mm (e.g. 1.7 mm). The integrated circuit, microphone, and speaker may be placed preferably 1 mm from the edge and more preferably 2 mm from the peripheral of the printed circuit board. The battery may be placed on the side of the module 14 opposite the speaker. The battery may be round or elliptical. The user controls 40 will come into contact with the module underneath the speaker. This allows for the minimum amount of space to be used, while keeping the wristband compact. The user controls will contact a control switch located in the electronic module, which allows for the signal to record, play, stop, etc. to be relayed when the user controls 40 are pressed by the user. All of the components of the electronic module 14 may be attached to a printed circuit board 44 and then the entire module 14 may be encapsulated in a housing 46, which will hold all of the components in place and allow for the module to be placed into the wristband. The housing may include a thin walled structure (e.g. having a wall thickness on the order of about 1 mm in thickness). The housing may be open at one of its ends for exposing the components. It may have a protective membrane over such end to protect the components. The housing preferably connects to the printed circuit board, such as by a peripheral connection (e.g. a peripheral groove in the wall of the housing that is fitted around the circuit board). An example of the geometry of the housing is shown in FIG. 7. It may include opposing arcuate wall portions connected together optionally by one or a plurality of flat wall portions that span between the opposing arcuate wall portions. The housing may have a height from the top to the bottom of the walls is at least about 5 mm (e.g. about 8 mm or higher). It has an upper edge, preferably the top of the wall that is substantially juxtaposed with the speaker.

As discussed a rear surface 34 may enclose the electronic module within a cavity of the bulbous portion. The rear surface may include a flange 54 (which optionally may be threaded). The flange may be in contact with a bottom edge of the housing, as shown in FIG. 6 or it may be spaced therefrom (e.g. via an elastomeric seal). The entire electronic module may thus project upward from an inner face 56 of the cover in an amount of more than about 5 mm and less than about 12 mm (e.g. about 8 mm).

The bulbous portion of the device may vary in size and or geometry from device to device. It is possible to configure the bulbous portion so that a single sized module can be used in different sized bulbous portions, therefore, allowing interchangeability among bands and bulbous portions of different size and/or shape. Preferably the $L_1$ dimension (see FIG. 7) of the bulbous portion of the wristband is substantially less than 7 cm and preferably less than 6 cm and even more preferably less than 5 cm (e.g. about 3 to about 4 cm). Preferably the $W_1$ dimension (see FIG. 7) of the bulbous portion of the wristband is substantially less than 7 cm and preferably less than 6 cm and even more preferably less than 5 cm (e.g. about 3 to about 4 cm).

The bulbous portion may be of generally constant width and length, or it may include plural different widths and lengths (e.g., a maximum width $W_{1max}$, and a minimum width $W_{1min}$). The ratio of $W_1:L_1$ preferably is greater than about 1.4:1, more preferably greater than about 1.3:1. The ratio of $W_1:L_1$ preferably is less than about 10:1, more preferably less than about 5:1. For example, the ratio of $W_1:L_1$ may be about 1:1 to about 1:1.4.

The microphone and speaker, which are located in the electronic module, which is located in the wristband is placed under the outward facing surface 30.

The digitally recordable/playable device contains an energy source to run the electronic module. Examples of energy sources may include, but are not limited to, a capicator, battery, solar, and kinetics (e.g. a device that converts motion into electricity). A preferable embodiment of the invention includes a battery (e.g. a CR2032 battery). The battery is replaceable via a cover that may be located on the back of the electronic module and accessed through the rear surface 34. The cover may be screwed into the electronic module and may be made of stainless steel, titanium, aluminum, etc.

The wristband may contain a port for accessing the electronic module (e.g. a port which is located in the electronic module) though a preferred embodiment omits one. This port may be used to connect to another electronic device, for example but not limited to, a computer, cell phone, or another wristband. This port would allow for the wristband and another electronic device to be connected and information transferred between the two devices. This would also allow for additional storage of important messages.

Alternatively, or in addition to a port, the wristband may include a transmitter, which is located in the electronic module. The transmitter may be capable of transmitting the recorded message from the wristband to some other storage device, such as but not limited to, a cell phone, computer, or another wristband using wireless means, such as but not limited to, infrared, radio, cell phone, or wireless internet. The user could access an internet website, local server, computer disk or some such for downloadable digital audio messages as a reward for solving or decoding messages or playing games educational or otherwise. Optionally the user's level of play could also be downloaded and displayed on the wristband or device for visual acknowledgement.

One possible use of the wristband may be to provide reminders to the wearers; thus, the invention contemplates at least one step of providing reminders to the wearer. Some examples of possible uses could be: providing message reminders to children; alerting persons to a medical condition of the wearer; providing emergency contact information; providing an advertising message (providing a way to communicate with a user about a promotional program for a good or service); modifying behavior for achieving user weight loss, for smoking cessation, or both; assisting user to memorize information; or reminding a user about taking and/or refilling medication (e.g. prescription drugs).

The devices herein may include a plurality of buttons as user controls. It may include a single button as a user control. The device may be voice activated and not require a user control button to activate the recording, or recording may be activated by performing a task other than activating a user control. The user controls are preferably mounted so that they are not susceptible to inadvertent activation. For example they may be located on the sides of the device as shown.

The invention may be used by corporate customers to promote a product or service, or by sports enthusiasts to display allegiance to a particular team (e.g. having the device play a school's fight song and having the college logo printed on the device). This would prove beneficial in some instances where a wearable audio message or song combined with a color and/or logo customized band and/or sound module encasement could help convey the intended message.

The device herein may be used as part of a method that includes steps of creating and then randomly distributing a small number of special bands that are digitally pre-programmed to announce free offerings or prizes amongst a large number of regular wristbands. For example the devices maybe programmed with an announcement of an award offer or the winning of a prize.

They may have initial special wristbands that may have an initial regular message that would be played a pre-determined number of times where after another alternate special message declaring the offering/prize would be activated. This could entice user's to repeatedly play the pre-recorded message to determine if they have a band that wins the offering/prize. The electronic portion of the band could also be produced such that it had a port, transmitter or other such for communicating with a computer that a wearer could use with a computer/terminal at a predetermined location(s) to determine if the user's band wins the offering/prize.

Another aspect of the invention contemplates a method of offering the wristbands for sale, by which a customer is provided with an array of different options for enabling the customer to customize an assembled wristband. For example, the customer may be provided with a choice of electronic components, band colors, and/or accessories. Customers may be able to order pre-recorded messages or wristbands with a message and/or logo incorporated visually. Sales may be made via a mail-order catalog and/or through an internet website.

Wristbands could include additional features such as; water resistance, compass, illumination, GPS transmitter, time automated activation, volume control/adjustment, digital data storage, voice amplifier, radio frequency (RF) transponder, a device (e.g., a RF device) for communication between wristbands, heart rate monitor, visual electronic display, sound alteration feature, message rewind/fast forward/with delete/truncation/extension option, multiple message storage and playback, multiple message scrolling/selection feature, and LED display for notification of function activation, etc.

Another aspect of the invention contemplates a method of using the devices herein that includes downloading or programming a device with audio that may include sounds, phrases, codes, songs, stories, educational messages, greetings, memorization items, etc.

It will be appreciated that the audio wristbands herein are not limited to wristbands. Such features may also be designed into other wearable items such as necklaces, rings, clothing, personal accessories and the like. Products that are configured as hook-on recordable devices for backpacks, lunchboxes, belt loops, or the like are also contemplated.

Methods of imparting a design or logo onto the band and/or electronic encasement could be by molding, etching, printing, painting, sewing, weaving, adhesion, etc., or any combination.

Methods herein may include some or all of the steps, providing a printed circuit board; attaching a chip, speaker, and microphone to a first surface of the printed circuit board and attaching signaling communication so that an electrical signal will cause the electronic module to operate; locating a termination on one of the surfaces the terminal receiving a power supply (e.g. a battery) for power the electronic module; forming a contact structure and signaling communication with the chip and being acuatable by the user control; or encapsulating the electronic module in a protective housing that allows transmission of sound. The module can be created as described here.

The devices of the current invention may include one or more of the following features: it may be free of any time keeping function, it may be free of a display, it may be free of a crystal, it may be provide a large surface area for receiving a graphic design on the bulbous portion, and may be free of any hinge and/or hinge pin.

It is understood that the description herein is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventor did not consider such subject matter to be part of her disclosed inventive subject matter.

What is claimed is:
1. A portable device comprising:
   a. an electronic module that provides audio recording and playback functions and includes:
      i. at least one integrated circuit having associated memory storage,
      ii. a microphone, iii. a speaker, and
iv. a power source;
b. a bulbous portion that substantially encapsulates the electronic module and is configured so that the device includes:
   i. a largest spanning dimension of less than about 60 mm and
   ii. a substantially continuously contoured outer surface that is free of any display; and
c. one or more exposed user controls that:
   i. laterally project from at least one side of the bulbous portion,
   ii. signally communicate with the electronic module, and
   iii. penetrate through the bulbous portion
wherein the microphone includes an upper surface that resides below and is spaced apart from an upper surface of the speaker, and the microphone is spaced apart from an outer surface of a cone of the speaker.

2. The device of claim 1, wherein the device is a wristband.

3. The device of claim 2, wherein the wristband includes a band and the band is configured as a continuous loop.

4. The device of claim 3, wherein the band is free of any hinges or the band is free of any hinge pins.

5. The device of claim 1, wherein the bulbous portion has a rounded outer surface.

6. The device of claim 5, wherein the rounded outer surface is defined by a plurality of different radii of curvature.

7. The device of claim 6, wherein the device is free of any user time-keeping function.

8. The device of claim 7, wherein the largest spanning dimension is between about 25 mm to about 40 mm.

9. The device of claim 1, wherein the device includes a plurality of apertures for exposing any microphone or speaker.

10. The device of claim 1, wherein the band is a thermoplastic polymer that has a coating layer over its outer surface.

11. The device of claim 1, wherein the device is a necklace, a chain, or a pendant.

12. The device of claim 11, wherein the microphone is positioned off to the side of the speaker.

13. The device of claim 12, wherein the speaker has diameter of about 14 to about 30 mM.

14. The device of claim 13, wherein the device is:
a. free of a crystal,
b. free of a time keeping function,
c. free of a hinge, and
d. free of a hinge pin,
wherein the bulbous portion has a rounded outer surface that is defined by a plurality of different radii of curvature.

15. The device of claim 1, wherein the bulbous portion contains at least one opening where a strap or chain is placed through.

16. A portable device comprising:
a. a electronic module that provides audio recording and playback functions and includes:
   i. at least one integrated circuit having associated memory storage,
   ii. a microphone, speaker,
   iii. a speaker,
   iv. a power source, and
   v. a printed circuit board that is attached to the speaker, the microphone, and the at least one integrated circuit;
b. a bulbous portion that substantially encapsulates and houses the electronic module and is configured so that the device includes:
   i. a largest spanning dimension of less than about 45 mm;
   ii. a substantially continuously contoured outer surface;
   iii. a rounded outer surface defined by a continuously curved outer surface having a plurality of different radii of curvature;
   iv. at least one opening where a strap or a chain is placed through;
c. at least two exposed user controls that:
   i. signally communicate with the electronic module,
   ii. penetrate through the bulbous portion, and
   iii. laterally project from at least one side of the bulbous portion; and
wherein the device is free of:
   i. any user time-keeping function and
   ii. any display;
wherein the device is a necklace, a chain, or a pendant;
wherein the microphone:
   includes an upper surface that resides below and is spaced apart from an upper surface of the speaker,
   the microphone is spaced apart from an outer surface of a cone of the speaker, and
   the microphone is positioned off to the side of the speaker.

17. The device of claim 16, wherein the device is made from a thermoplastic polymer that has a coating layer over its outer surface.

18. The device of claim 17, wherein the band is free of any hinges.

19. The device of claim 18 wherein the band is configured as a continuous loop.

20. The device of claim 19, wherein the device is free of:
a. a crystal,
b. a hinge,
c. a hinge pin, and
d. a display window.

* * * * *